(12) United States Patent
Baldwin

(10) Patent No.: US 8,210,304 B2
(45) Date of Patent: Jul. 3, 2012

(54) MOTORIZED PERSONAL TRANSPORT VEHICLE

(75) Inventor: Daniel Baldwin, Mylestom (AU)

(73) Assignee: Scarpar Pty Ltd., New South Wales (AU)

( * ) Notice: Subject to any disclaimer, the term of this patent is extended or adjusted under 35 U.S.C. 154(b) by 368 days.

(21) Appl. No.: 11/719,683

(22) PCT Filed: Nov. 21, 2005

(86) PCT No.: PCT/AU2005/001764
§ 371 (c)(1),
(2), (4) Date: May 18, 2007

(87) PCT Pub. No.: WO2006/053397
PCT Pub. Date: May 26, 2006

(65) Prior Publication Data
US 2009/0101427 A1    Apr. 23, 2009

(30) Foreign Application Priority Data
Nov. 19, 2004 (AU) ............................ 2004906640

(51) Int. Cl.
*A63C 5/08* (2006.01)

(52) U.S. Cl. .................................. 180/181; 180/9.1

(58) Field of Classification Search .......... 180/180, 180/181, 182, 183, 184, 185, 186, 190, 9, 180/9.1, 9.21, 9.23, 9.28, 9.3; 280/28, 28.5
See application file for complete search history.

(56) References Cited

U.S. PATENT DOCUMENTS

| | | | |
|---|---|---|---|
| 2,112,559 A * | 3/1938 | Davidson ..................... 280/458 |
| 2,260,027 A | 10/1941 | Hotson | |
| 2,625,229 A | 1/1953 | Voorhees | |
| 3,568,787 A * | 3/1971 | Gremeret ..................... 180/181 |
| 3,828,872 A | 8/1974 | Tsuchiya et al. | |
| 4,072,203 A * | 2/1978 | Pierson ....................... 180/9.44 |
| 4,221,394 A | 9/1980 | Campbell | |
| 4,307,788 A | 12/1981 | Shelton | |
| 4,337,961 A | 7/1982 | Covert et al. | |
| 4,453,611 A * | 6/1984 | Stacy, Jr. ..................... 180/9.44 |
| 4,600,073 A | 7/1986 | Honett | |
| 5,022,668 A * | 6/1991 | Kenny ......................... 280/7.14 |
| 5,228,528 A * | 7/1993 | Sauve ......................... 180/9.25 |
| 5,263,725 A | 11/1993 | Gesmer et al. | |
| 5,305,846 A | 4/1994 | Martin | |
| 5,487,441 A | 1/1996 | Endo et al. | |
| 5,580,096 A * | 12/1996 | Freilich ....................... 280/844 |
| 5,819,865 A | 10/1998 | Cowley | |
| 5,975,229 A * | 11/1999 | Hosoda ........................ 180/181 |
| 6,007,074 A | 12/1999 | Tarng | |
| 6,050,357 A | 4/2000 | Staelin et al. | |
| 6,435,290 B1 | 8/2002 | Justus et al. | |
| 6,467,560 B1 | 10/2002 | Anderson | |
| D476,599 S * | 7/2003 | Whittington ..................... D12/7 |
| 7,434,644 B2 * | 10/2008 | Wier ............................. 180/180 |
| 7,458,592 B2 * | 12/2008 | Maratta ...................... 280/87.041 |

FOREIGN PATENT DOCUMENTS

CA    1322380    9/1993
WO    WO 88/04565 A    6/1988

* cited by examiner

*Primary Examiner* — Jeffrey J Restifo
(74) *Attorney, Agent, or Firm* — Fraser Clemens Martin & Miller LLC; J. Douglas Miller

(57) ABSTRACT

The vehicle (1) includes a chassis (2) and a pair of track assemblies (3, 4) mounted at the front and rear of the chassis respectively. At least one of the track assemblies is powered by a motor (5) to propel the vehicle. The chassis include mounting points (6, 7) for attaching the track assemblies. A deck area including rider footpads (8, 9) flanks a central motor mounting section (10).

20 Claims, 18 Drawing Sheets

MOTORIZED PERSONAL TRANSPORT VEHICLE

FIELD OF THE INVENTION

The present invention relates generally to powered personal transport vehicles, and more particularly to recreational powered personal vehicles such as motorised skateboards and the like.

BACKGROUND OF THE INVENTION

The invention has been developed primarily for use as a personal recreational vehicle, and will be described predominantly with reference to this application. It will be appreciated, however, that the invention is not limited to this particular field of use, being also adaptable to other types of transport uses outside those categorised as strictly recreational.

Any discussion of the prior art throughout the specification should in no way be considered as an admission that such prior art is widely known or forms part of common general knowledge in the field.

Surfing, snowboarding and skateboarding are very popular recreational activities. In each case the rider stands on a board and steers the board by positioning feet and bodyweight as well as by angling the board. All three activities rely on gravity and a low friction interface between the board and the surface the board travels over. This means that they can only be ridden in special circumstances and/or under particular environmental conditions.

Attempts have been made to construct a more versatile board that can be ridden over rough ground in the same manner as surf, snow and skateboards. One such attempt is the off road skateboard or "mountain board". These boards use larger wheels than a conventional skateboard to enable the board to roll over rough and uneven ground. However, like conventional skateboards, mountain boards are non-powered and depend on being ridden downhill.

To allow boards to operate without the assistance of gravity it is known to provide them with a power plant, such as a small internal combustion engine or electric motor. While these boards work adequately over many surfaces, the wheels can become bogged when transiting soft ground or snow.

It is an object of the present invention to overcome or ameliorate one or more of these disadvantages of prior art, or at least to provide a useful alternative.

DISCLOSURE OF THE INVENTION

Accordingly, the invention provides a personal vehicle including;
a chassis;
a front track assembly attached to a front portion of the chassis;
a rear track assembly attached to a rear portion of the chassis, wherein each track assembly includes a plurality of rollers and a continuous track looped around the rollers;
a motor for driving at least one of the tracks; and
a rider platform for accommodating a rider to ride on the vehicle.

Preferably, the rider steers the vehicle by adjusting lateral weight distribution on the chassis.

Preferably, at least one track assembly is configured to yaw with respect to a longitudinal axis of the chassis in response to the rider adjusting lateral weight distribution on the chassis.

Preferably, the front track assembly is configured to yaw in a lateral direction in response to the rider adjusting lateral weight distribution on the chassis toward the same lateral direction and the rear track assembly is configured to yaw in a lateral direction in response to the rider adjusting lateral weight distribution on the chassis away from the lateral direction.

Preferably, at least one track assembly is pivotally connected to the chassis for rotation about a steering axis elevated from the longitudinal axis of the chassis by a steering angle.

Preferably, the steering angle is between 20° and 55°.

Preferably, at least one track assembly includes a sub-chassis connected to the chassis by means of a hanger assembly.

Preferably, the sub-chassis includes a pair of side plates between which the rollers are mounted and the rollers are disposed for rotation on generally parallel axes, wherein the axes are aligned in a curved linear array, adjacent a peripheral edge of each of the side plates.

Preferably, the hanger assembly includes a base on the chassis and a yolk connected to the sub-chassis by a plurality of arms and, wherein the yolk is hingedly connected to the base for rotation about a steering axis elevated from the longitudinal axis of the chassis.

Preferably, each track assembly includes a driven roller for driving the track and the motor is connected to each driven roller by means of a drive train.

Preferably, the drive train includes a gearbox for distributing drive to each driven roller.

Preferably, the drive train includes at least one drive mechanism selected from the group including; chain drive, belt drive, shaft drive, telescopic shaft drive, gear drive, universal drive, flexible shaft drive, hydraulic drive and pneumatic drive.

Preferably, the drive train includes a telescopic shaft drive and a pair of universal joints disposed at opposite ends of the shaft.

Preferably, the telescopic shafts include an inner shaft and outer sleeve which are correspondingly ribbed.

Preferably, wherein the chassis includes a deck area having front and rear rider footpads to enable the rider to stand and ride on the vehicle.

Preferably, the motor is an internal combustion engine.

Alternatively, the motor is an electric motor 77, preferably housed within the sub chassis, as shown in FIG. 18B.

Advantageously, the tracks provide a large contact area with the ground to give the vehicle superior ability in crossing soft or boggy ground, for instance sand or mud, and also provide superior traction in comparison to conventional wheeled off road boards.

BRIEF DESCRIPTION OF THE DRAWINGS

A preferred embodiment of the invention will now be described, by way of example only, with reference to the accompanying drawings in which:

FIG. 133B is a schematic view displaying an alternative embodiment of rollers;

PREFERRED EMBODIMENTS OF THE INVENTION

Figure 1:
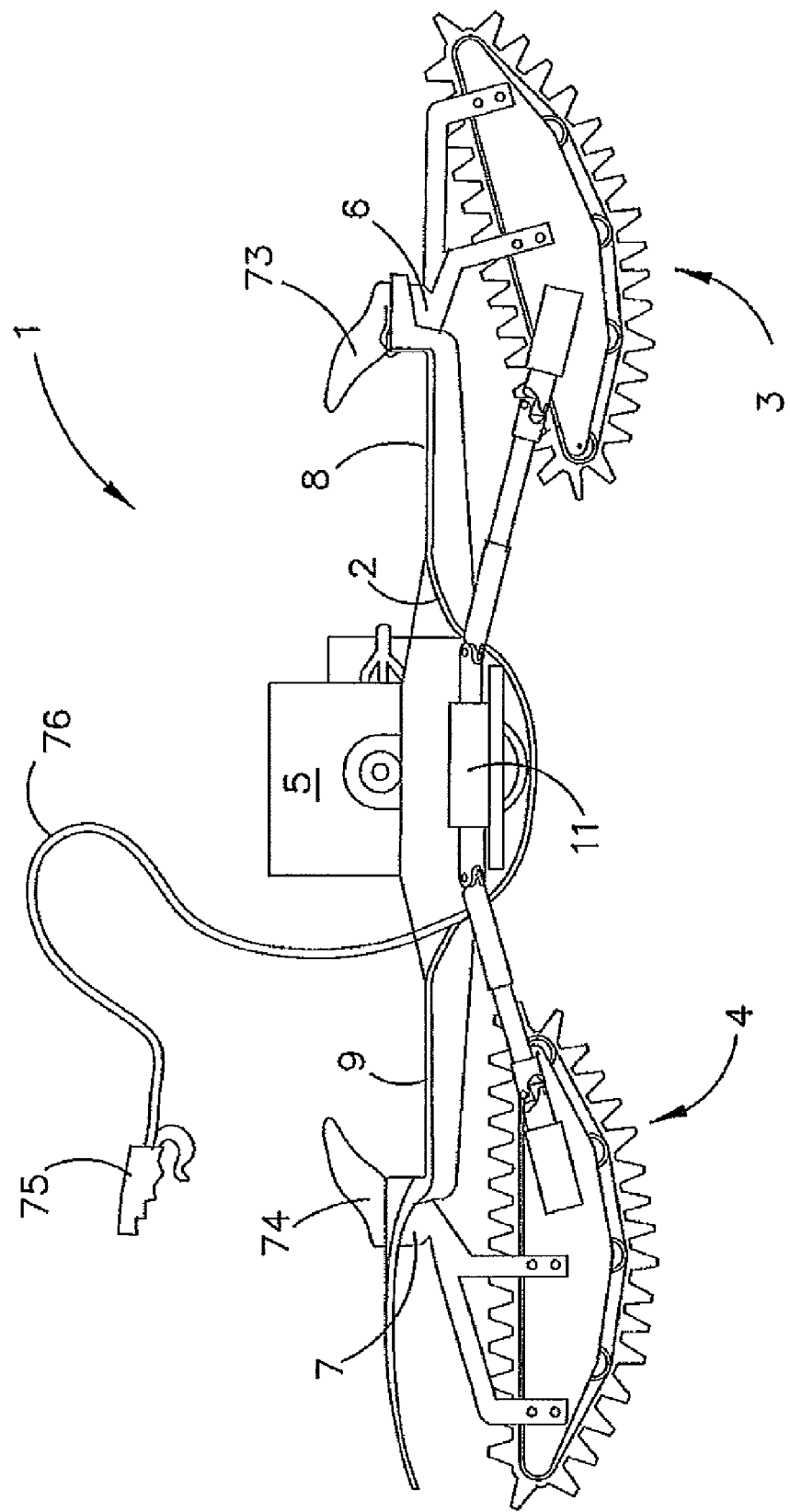
FIG. 1 is a side view of a vehicle in accordance with the invention.

Referring to the drawings, the invention provides a motorised personal transport vehicle. The vehicle 1 includes a chassis 2 and a pair of track assemblies 3 and 4 mounted at the front and rear of the chassis respectively. At least one of the track assemblies is powered by a motor 5 to propel the vehicle.

The chassis 2 includes mounting points at the front and rear, 6 and 7, for attaching the track assemblies, 3 and 4. A deck area including rider footpads to the front and rear, 8 and 9, flank a central motor mounting section 10. A T-drive gearbox 11, for splitting drive from the motor to each track assembly may also be mounted to the chassis, adjacent the motor.

The chassis is formed of a pressed aluminum sheet and includes welded reinforcing ribs 12. The ribs 12 act as a backbone to strengthen and stiffen the sheet so that it does not substantially deform or flex. The chassis includes a number of mounting formations for attaching various components of the vehicle at particular mounting points. The formations may be as simple as a hole for bolting on a point or a more complicated integral formation of the chassis.

In alternative embodiments, the chassis may be of any type of material and method of construction that provides a reasonably lightweight and preferably stiff body. For instance, the chassis may be made from timber, plastics, metal or composite material, it may be a simple board or constructed as a frame, truss, monocoque or pressed chassis, or any combination thereof.

Referring now to FIGS. 5 to 8, each track assembly, 3 and 4, includes a sub chassis 13, a continuous belt track 14 and a plurality of rollers, on which the track moves. As can be seen in the drawings, each sub chassis takes the form of a frame and includes a pair of side plates 20 and 21 between which the rollers are mounted. The axels and the rollers combine with struts 23 to hold the plates 20 and 21 apart, thereby forming the frame. Arms 24 attached to the side plates, join the track assembly to the chassis.

Figure 7:
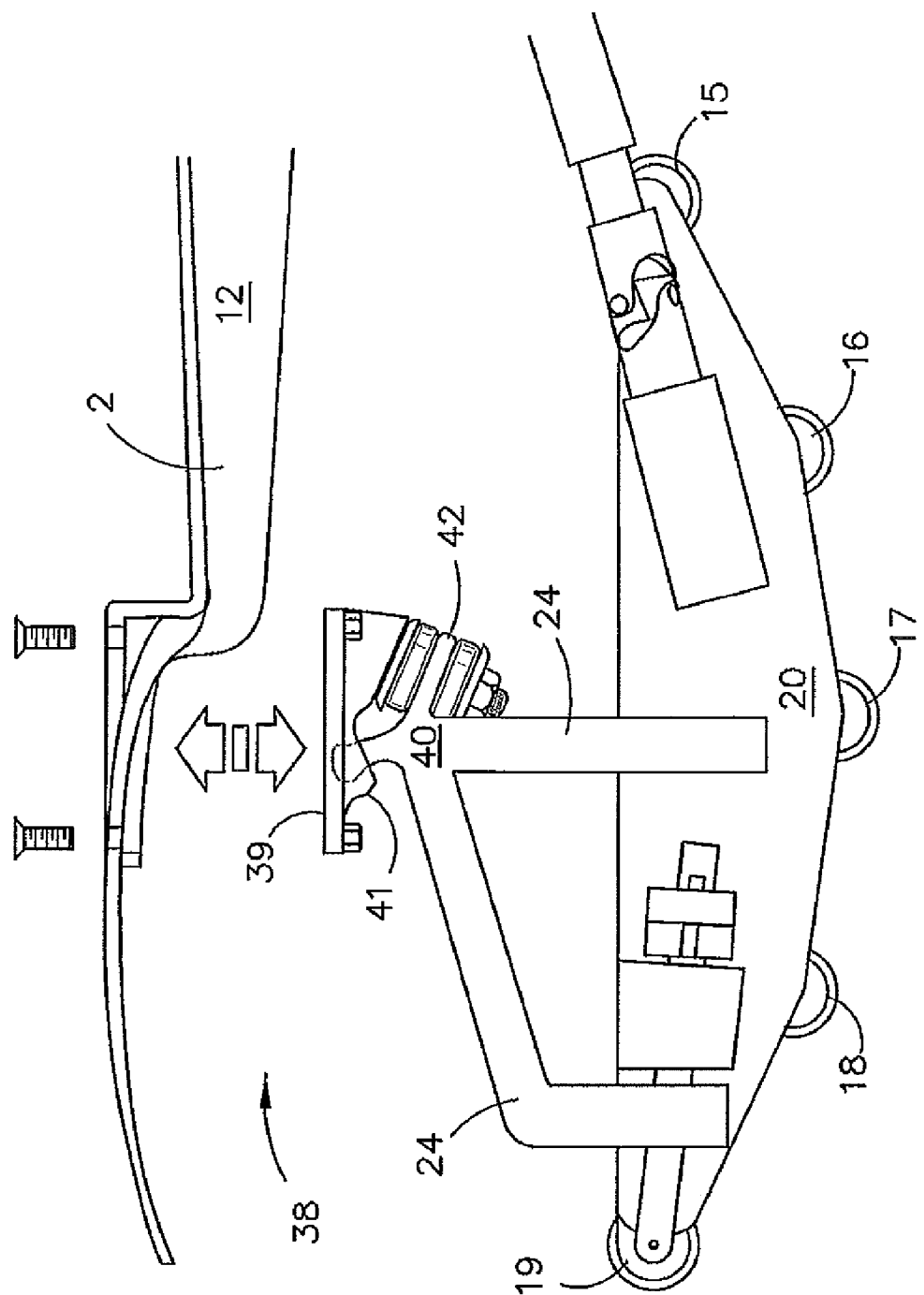
FIG. 7 is a detailed, partially exploded side view of a track assembly, hanger and chassis in accordance with the invention.
Figure 8:
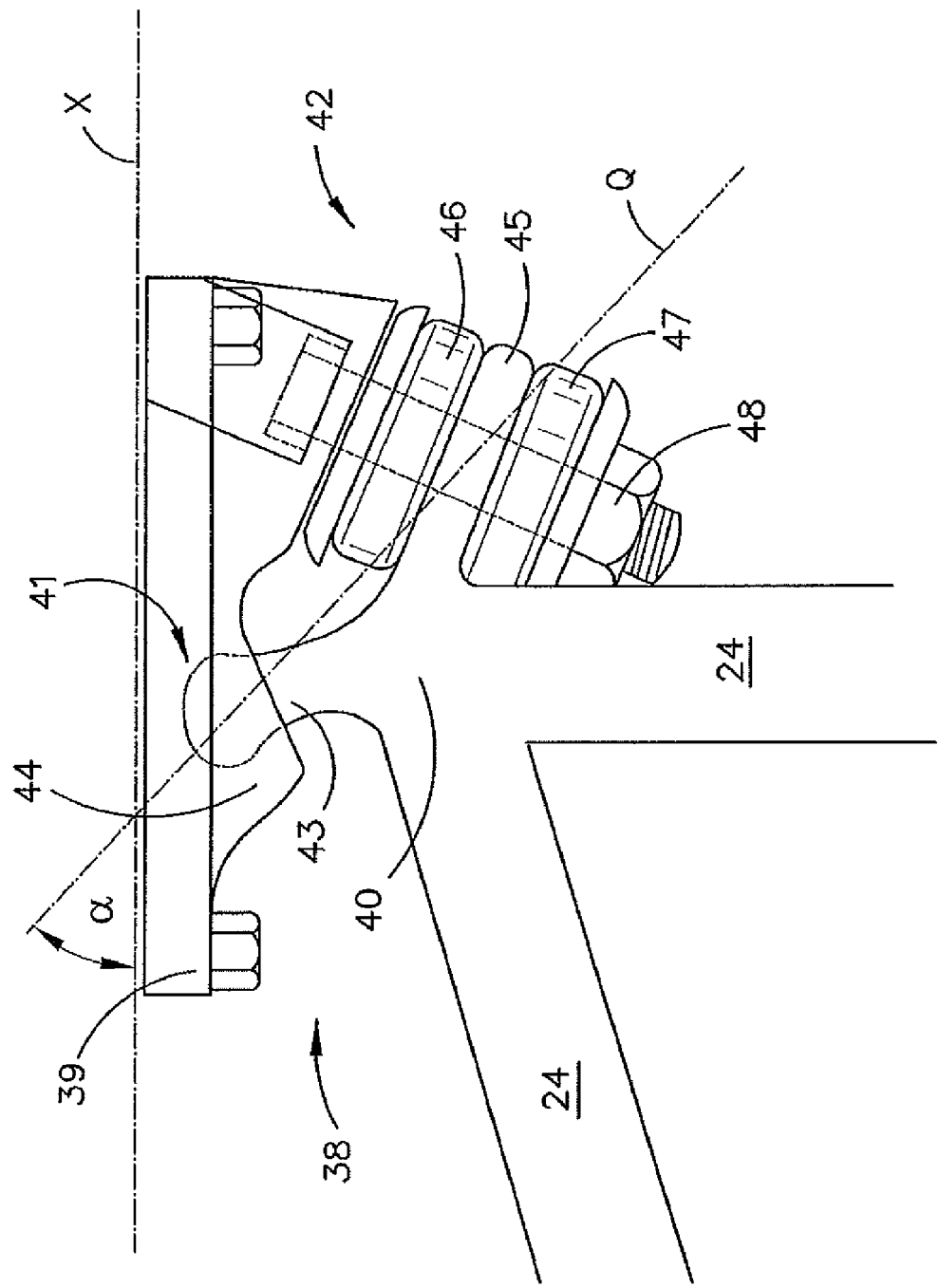
FIG. 8 is a detailed view of FIG. 7.
Figure 9:
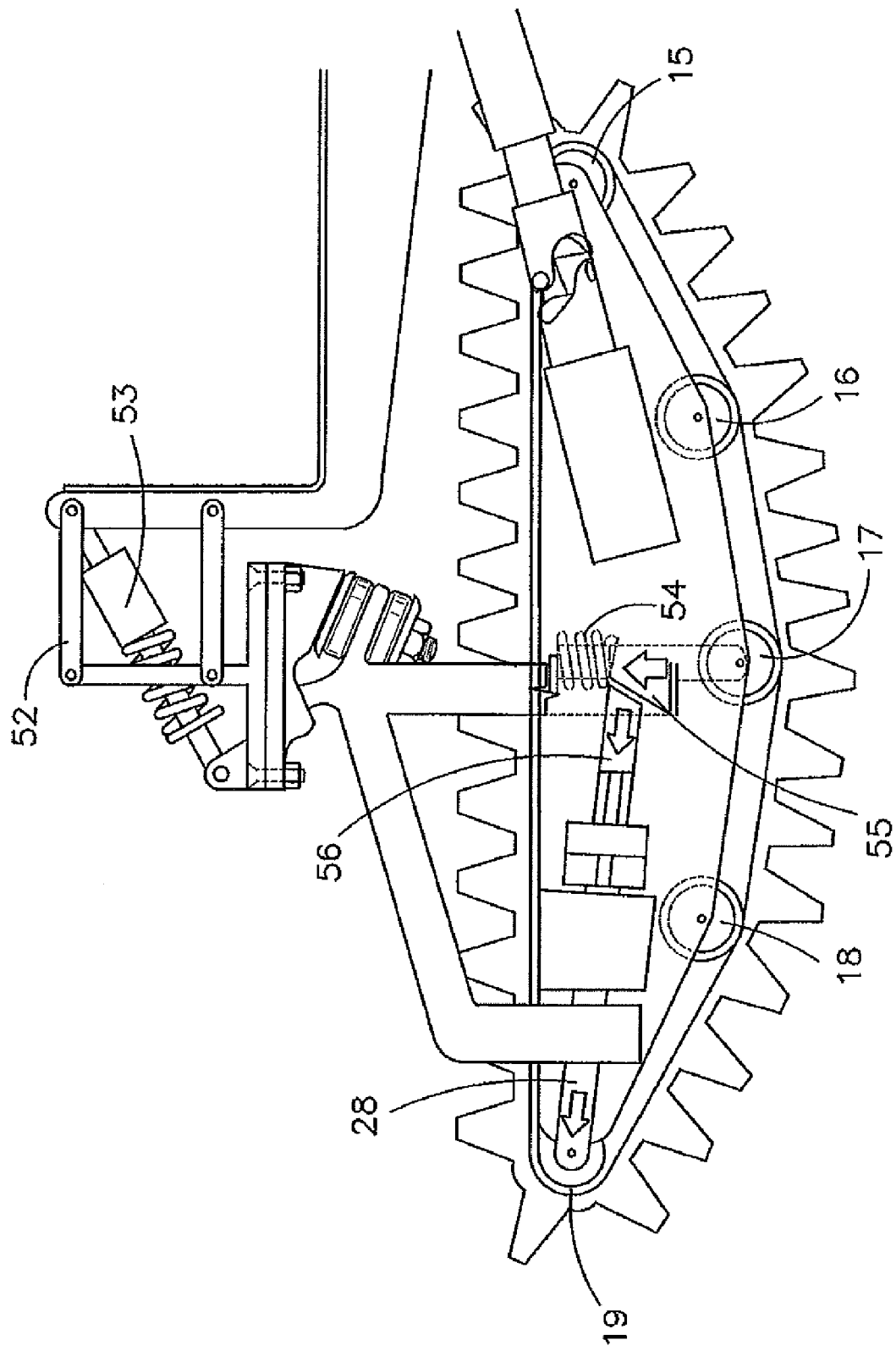
FIG. 9 is a detailed, assembled side view of a track assembly, hanger and chassis in accordance with the invention.
Figure 10:
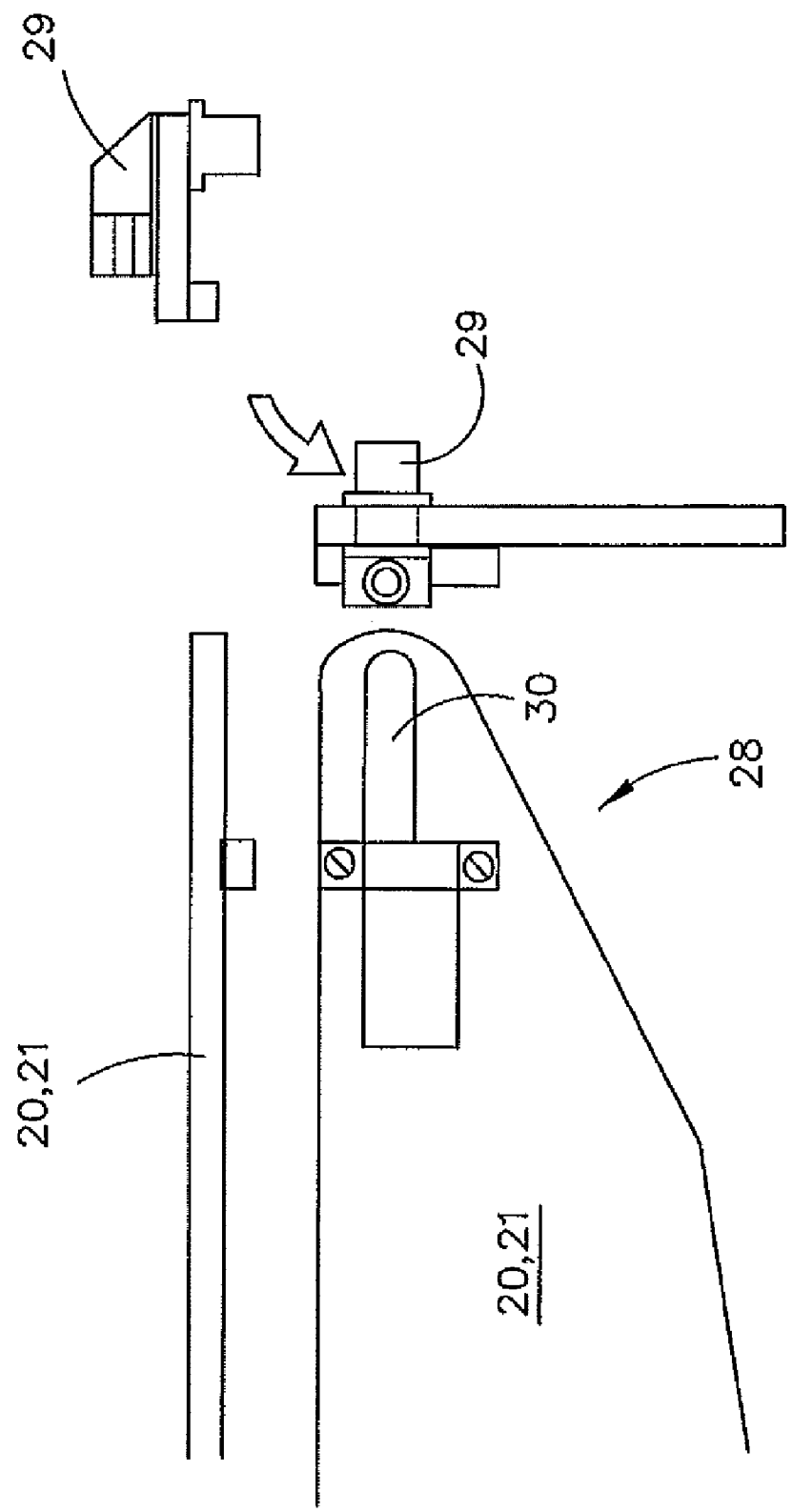
FIG. 10 shows a track tension mechanism in accordance with the invention.

Referring to FIGS. 7 and 9, each track assembly includes five rollers, numbered 15 to 19. The rollers are configured for rotation about generally parallel roller axes. These roller axes are aligned in a curved linear array, adjacent a lower peripheral edge of each of the side plates, 20 and 21.

Figure 13B:
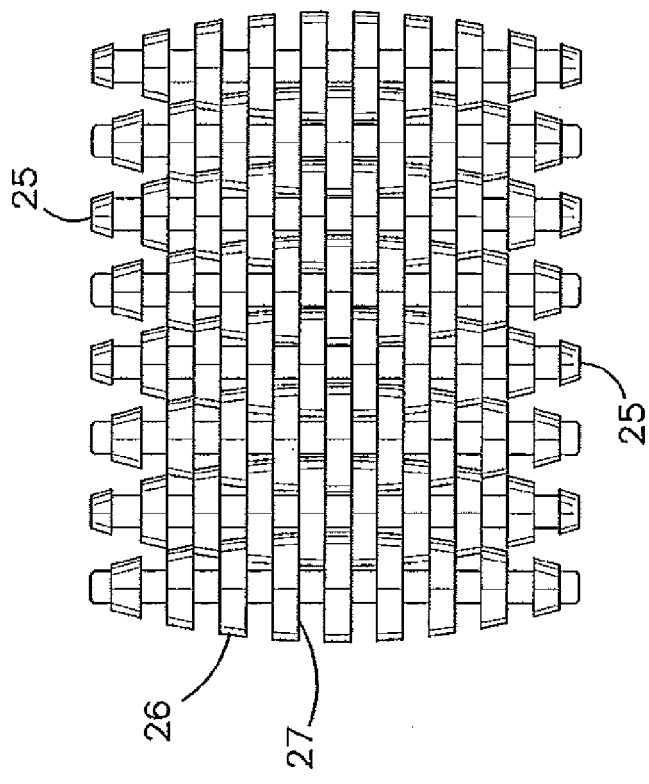
FIG. 13A is a schematic view displaying an alternative embodiment of rollers.
FIG. 13C is a schematic side view of FIG. 13B.
Figure 13C:
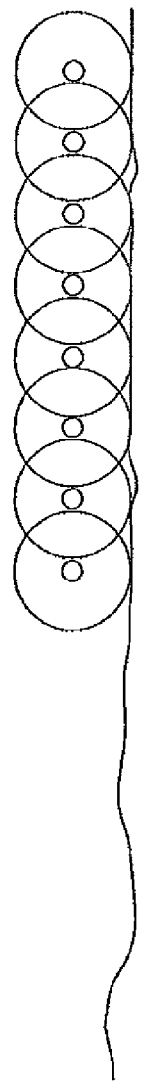
Figure 13A:
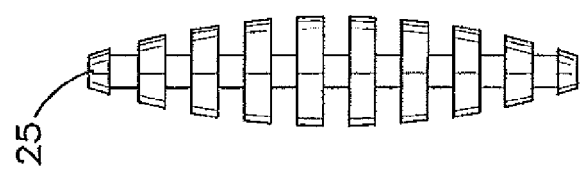

It will be appreciated that the exact positioning and number of rollers may be varied to alter the track shape and profile as required, without departing from the scope of the invention. For instance, FIG. 13 shows a plurality of intermeshing rollers 25 having corresponding male and female sections 26 and 27 to allow the parallel axes of the rollers to lie closer together and provide for extra support of the track. FIG. 13A illustrates an embodiment of intermeshing rollers 25 wherein the rollers 25 are provided with a generally convex lateral profile. Having a generally convex lateral profile, the rollers 25 are adapted to induce a convex lateral profile in a corresponding track.

Returning to FIG. 9, four of the rollers, 16 to 19 are free to rotate along with the track while one, driven roller 15, transmits drive from the motor to the track. Generally the driven roller 15 will be located on the extreme end of the track assembly. As will be appreciated, the end rollers have a greater proportion of circumference in contact with the track therefore, provide a larger surface contact area allowing for better power transfer. It will be appreciated that while the track shown in the drawings includes only one powered roller, in alternative embodiments more than one roller may be powered.

The roller 19 on the opposing end of the track assembly includes a track-tensioning mechanism 28. This mechanism can be clearly seen in FIGS. 5 and 9 where the roller 19 is mounted on stub axels 29. Each stub axle is mounted within a slot 30 and moveable along the slot by operation of an adjusting screw 31. The track tensioning mechanism may also be spring loaded so that adjustment of the track tension is automatic.

In this embodiment the track 14 is a one-piece molding of polyurethane. The resilient properties of the track allow it to be stretched around the rollers to aid in maintaining track tension. Furthermore, the flexibility of the track enables it to move around the rollers in the same manner as a conveyor belt.

The outer surface of the track is peppered with a tread in the form of knob projections 32. The knobs engage with the ground to provide increased traction. Accordingly, the size, shape and construction of the tread may be selected as appropriate to the predominate surface. For instance, if the board is to be ridden over snow or ice, metal studs may be preferable to provide biting engagement. Such metal studs may be screwed, glued, molded or heat welded into the track. If the board is to mainly be ridden over rock or paved surfaces, a track with a smoother profile formed of a harder compound rubber may be preferred. Sand or other loose surfaces may require a track with a cross ribbed appearance.

While in this embodiment each track is manufactured as a generally homogenous, one-piece construction, they may also be formed as a multi-part or non-homogenous construction. The track may also be formed of other resilient or non-resilient materials. The track may also include distinct layers or portions which combine to form the track. Some layers, portions and/or strips of the track may be formed of materials having specially selected properties. For instance, softer shock absorbing rubbers or materials may be used to give the track shock absorbing qualities. Alternatively, the track may contain either closed and/or open air chambers, also to provide shock-absorbing qualities. Materials which provide enhance grip or wear may be applied. The tracks may also include a stretch resistant belt layer.

In further embodiments still, the track may be formed of separate articulated links. Joins between the links provide flexibility either by pivots or by flexible sections of material. Such tracks may be formed of any combination of hard plastic, rubber, metal and/or composite materials.

Figure 11:
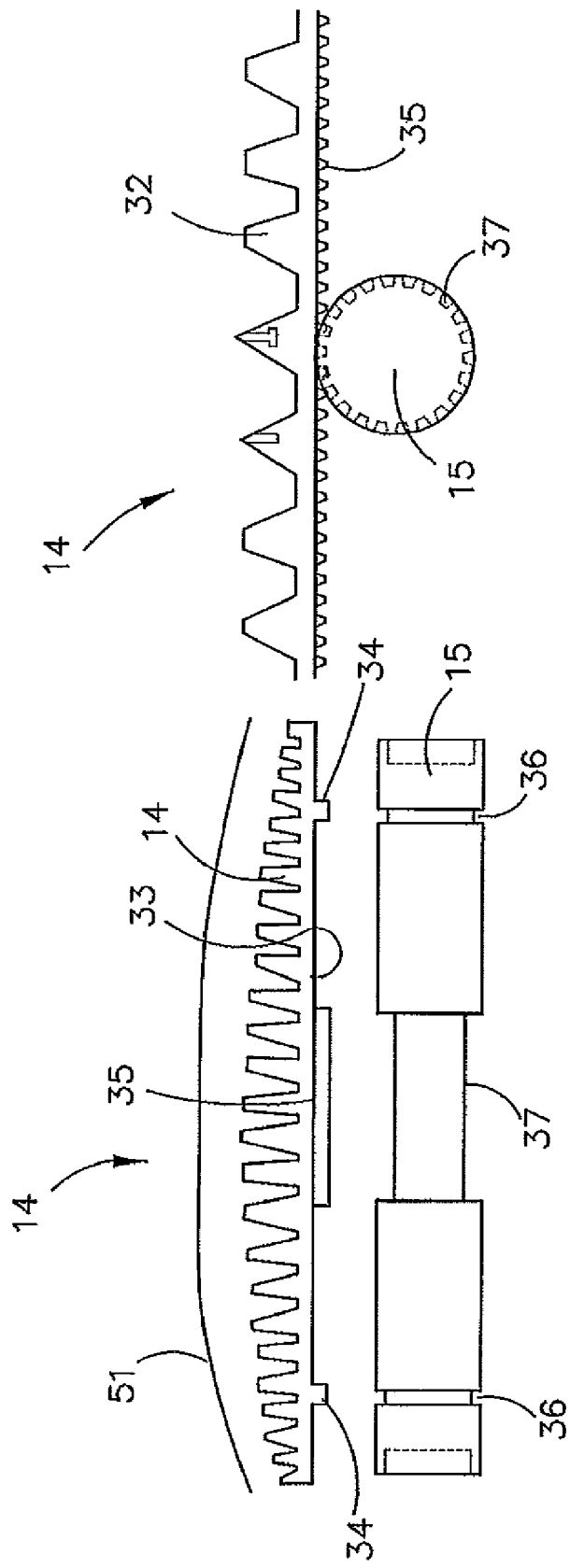
FIG. 11 shows front and side views of a track and drive roller.
Figure 12:
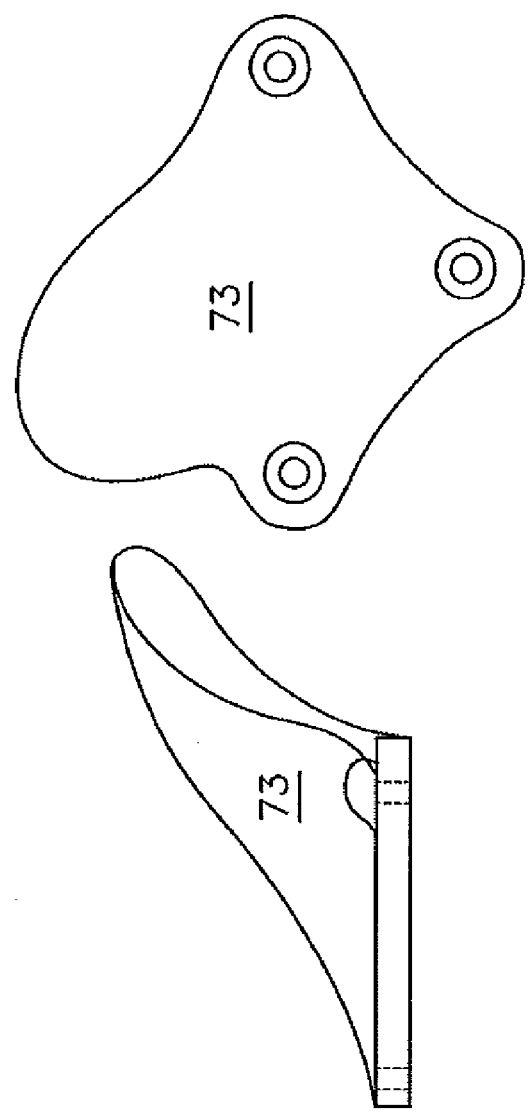
FIG. 12 are detailed views of the bindings.
Figure 12:
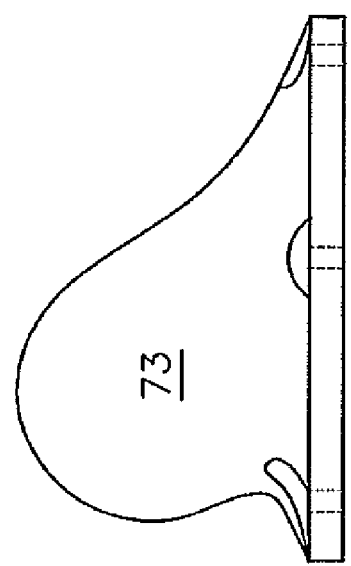

Referring to FIG. 11, the inside surface 33 of the track includes location and drive formations 34 and 35. The location formations 34 maintain alignment of the track on the rollers and are in the form of longitudinal ribs. These ribs engage corresponding grooves 36 in the rollers to maintain longitudinal alignment and prevent the track from wandering. In other embodiments the ribs may have a V-shaped cross section to locate in the correspondingly "V-shaped" groove in the rollers.

In addition, the corresponding drive formations 35 on the inner surface 33 of the track engage a ribbed drive section 37 on the drive roller 15 to transmit drive to the track. The drive section includes a circumferential array of axial ribs which act as teeth to engage the corresponding drive formations 35 on the track. In this way, drive is transmitted to the track from the power train without undue slippage and power loss.

In alternative embodiments, the locating and drive formations may be one and the same. Or, the connection may be similar to a chain and sprocket arrangement wherein the track forms the chain and the drive roller the sprocket. Such arrangements are used commonly on larger tracked vehicles but may be readily applied to the current member.

Each track assembly 3 and 4 is attached to the chassis 2 by means of a hanger assembly 38. The hanger assembly not only provides a means of connecting the track assembly to the chassis, but also provides a steering system for the vehicle. The steering system operates when the chassis rolls about a longitudinal axis with respect to the track assembly. This results in a corresponding yawing or rolling about a vertical axis of the track assembly with respect to the chassis. In this respect, the steering system operates in a similar manner to that of a conventional skateboard and as such, the hanger assembly 38 is very similar to the 'trucks' used in the art of skateboarding.

Referring again to FIGS. 7 and 8, each hanger assembly 38 includes a base 39, attached to the chassis and a yoke piece 40 connected by the arms 24, to the track assembly. The base 39 and yoke 40 engage one another at two points. These points are a ball and socket pivot joint 41 and a bushed pivot 42.

The ball and socket pivot 41 includes a pivot pin 43 mounted on the yoke piece 40. The pin 43 sits in a socket 44 on the base 39. The bushed pivot includes a ring 45 on the yoke 40 clamped between a pair of resilient bushings 46 and 47 by bolt 48. The bolt ties the yoke 40 to the base 39 and the resilient bushings allow for relative movement in either direction whilst maintaining a bias toward a central position where the longitudinal axes of the chassis and track assembly are aligned.

The ball and socket, and bushed pivot points define an approximate steering axis of rotation Q between the track assembly and the chassis. As can be seen in the FIG. 8, the steering axis Q is elevated from the horizontal longitudinal axis X of the chassis by steering angle α. The steering axis Q provides a fixed relationship between the yawing and rolling of the track assembly with respect to the chassis. That is, any relative roll of the track assembly with respect to the chassis must induce a corresponding proportional amount of yaw. It will be appreciated that, the steering axis Q remains generally co-planar with the longitudinal axis X.

It should be noted that the steering angle α between the axis Q and the horizontal determines the proportional magnitude of the induced yaw. For instance, the larger the steering angle α between axis X and steering axis Q, the larger the proportional induced yaw for a given amount of roll. Thus, by adjusting the steering angle α the handling characteristics of the vehicle can be tailored. In a theoretical sense the steering angle α could be a value greater than 0° and less than 90°, and induce yaw in the track assembly from a corresponding roll. However, in practice steering angles of between 15° and 70° provide the acceptable steering response whilst steering angles between 20° and 55° are preferred.

In use, as in a conventional skateboard, the rider can steer the vehicle by transferring weight to one side of the chassis. This rolls the chassis with respect to each track assembly which in turn, induces a resultant yawing of the track assemblies. The hangars are configured so that a transferring weight to the right of the chassis will cause the front track assembly to yaw to the right and the rear track assembly to yaw to the left.

Figure 3:
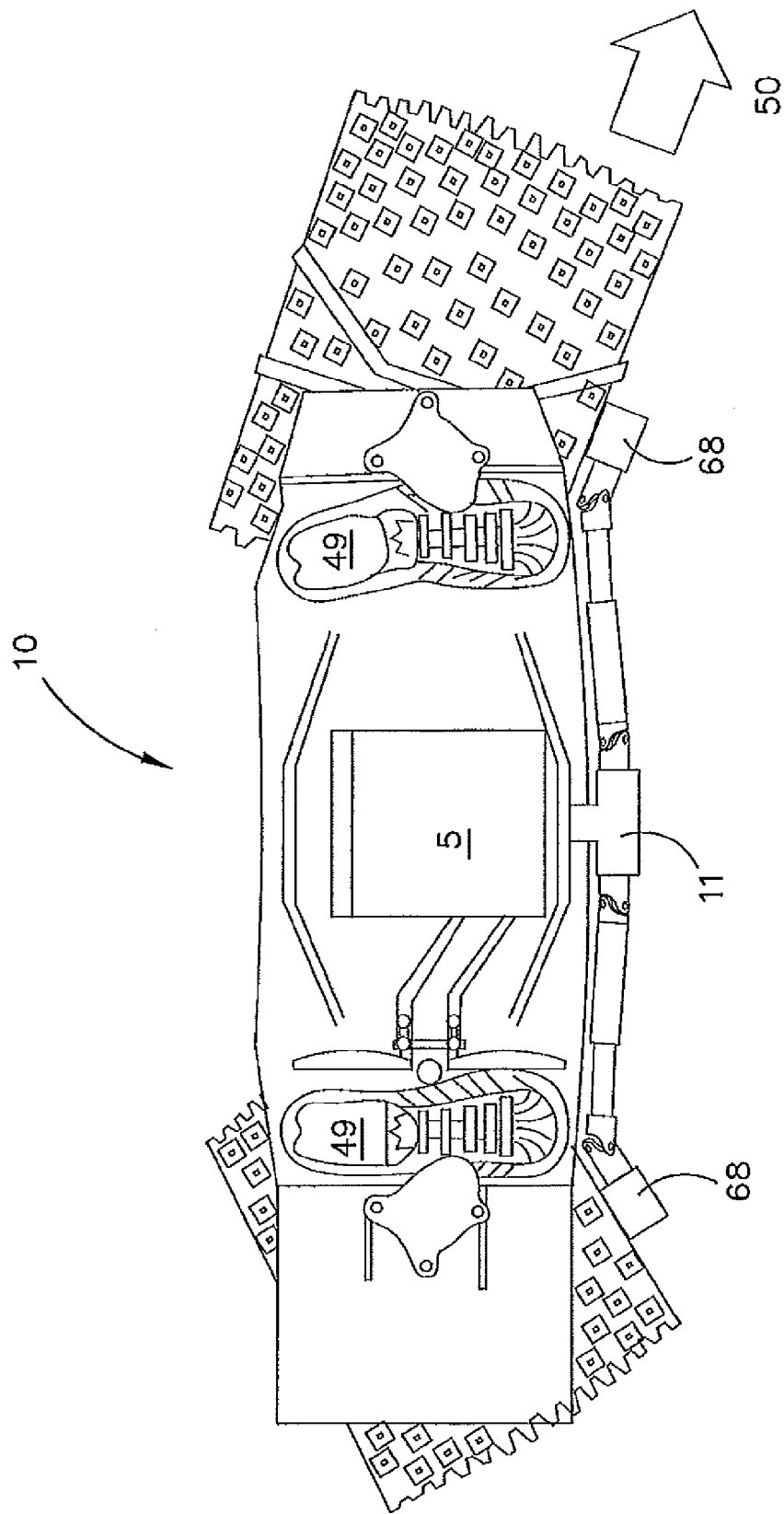
FIG. 3 is a top view of the vehicle shown in FIG. 1 displaying the tracks configured for tuning.
Figure 4:
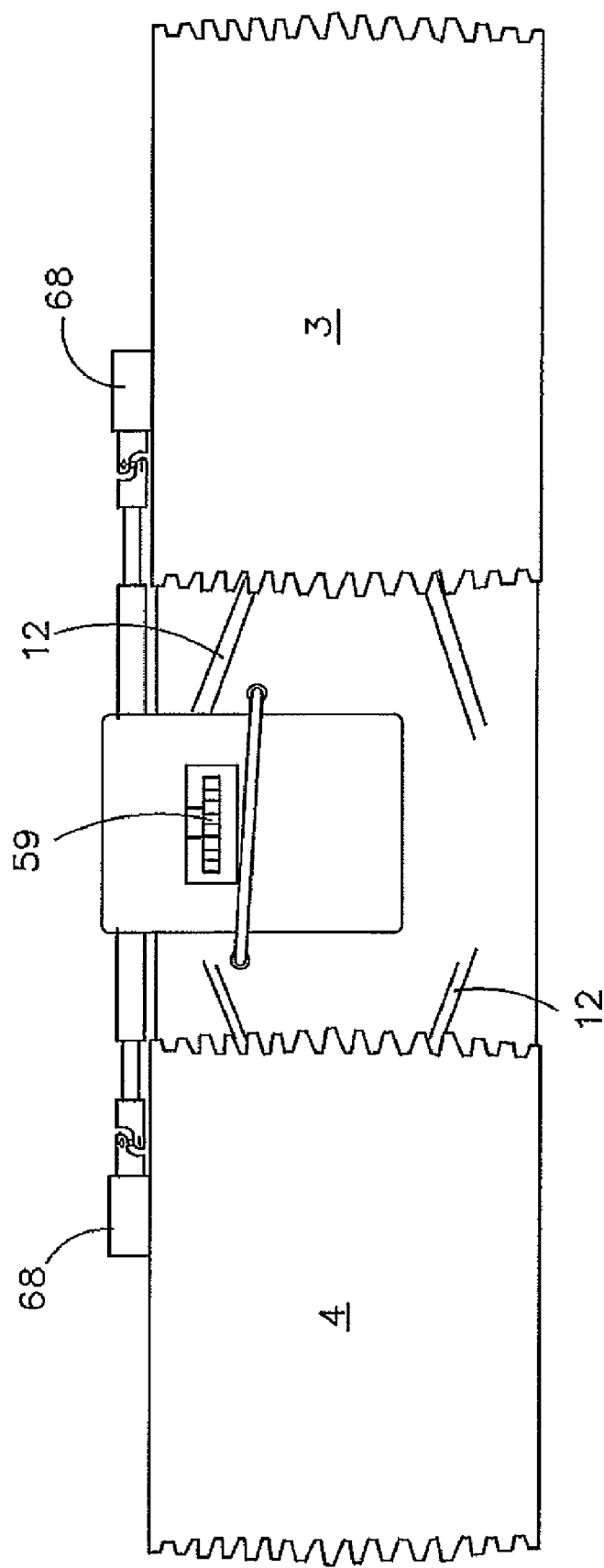
FIG. 4 is a bottom view of the vehicle shown in FIG. 1.
Figure 5:
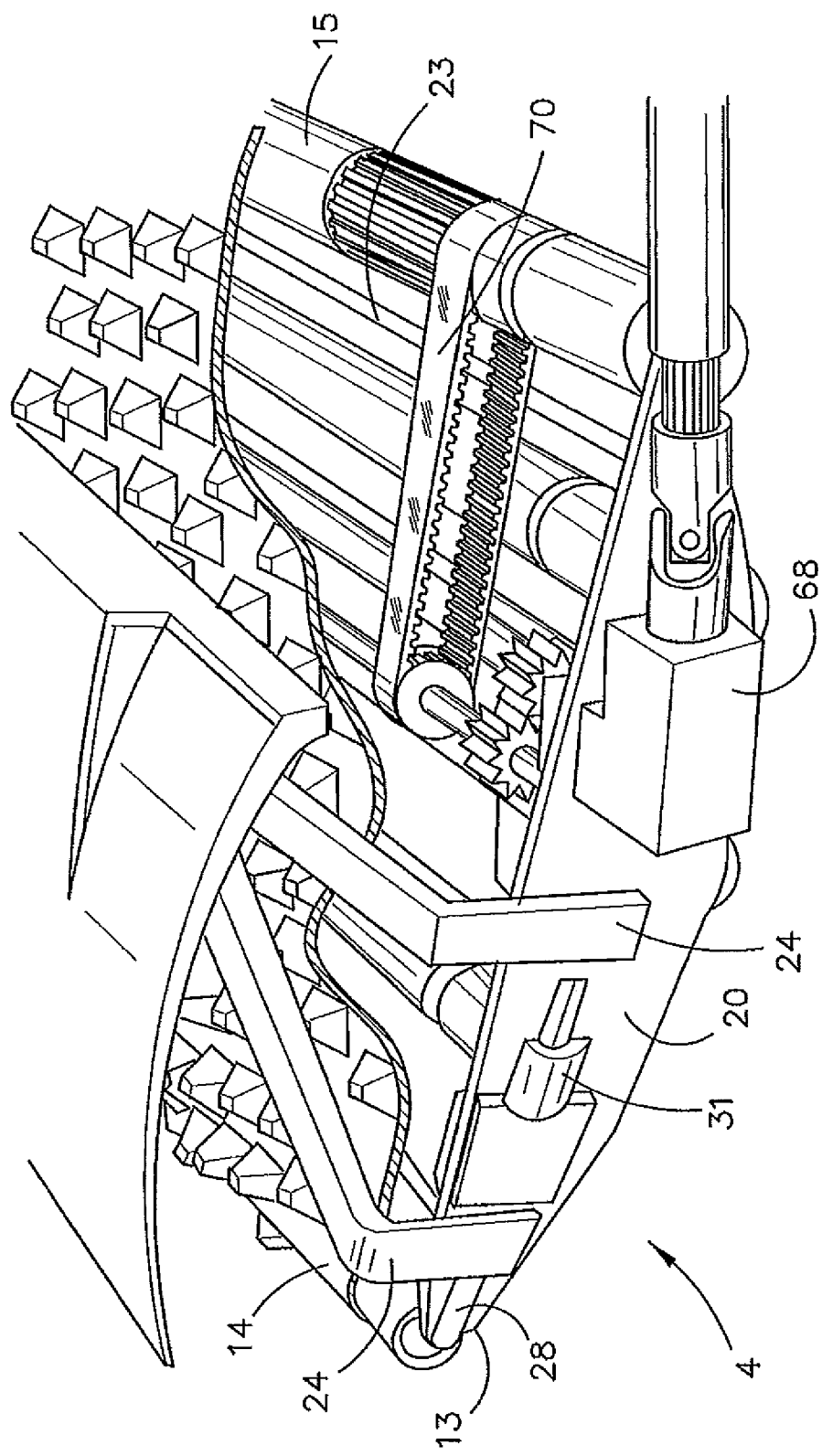
FIG. 5 is a sectional pictorial view of a track assembly in accordance with the invention.

This situation is exemplified in FIG. 3 where a hypothetical rider, positioned on the footpads as shown by the shoes 49, has applied downward pressure with the toes to the right side of the chassis. The pressure results in a rolling of the chassis with respect to the track assemblies to the right. As can be seen the rolling causes the forward track assembly to yaw to the right and the rear track assembly to the left. Consequently, the board advancing in the direction of arrow 50 will turn to the right, the direction of weight transfer. Conversely, if the rider shifts weight to the left of the board, the front and rear tracks will be compelled to yaw to the left and right respectively, enabling the vehicle to turn to the left.

It will be appreciated that because the rider leans or shifts their weight into the corner to steer, in a similar manner to a skateboard, the weight shift can also have the effect of balancing centrifugal forces generated in the turn in a similar way to a motorcycle may lean in a turn.

The degree of yaw from the track assemblies and corresponding radius of turn to the weight shift may be regulated to some degree by tightening or loosening the bolt 48, Tightening the bolt preloads the bushings 46 and 47 resulting in a stiffer steering system whereby more force is required on the side of the chassis to induce a given angle of yaw in the track assembly. As will be appreciated, in this way, the stability/manoeuvrability of the vehicle can be pre-selected to some degree.

A similar effect may be achieved by selecting the stiffness of the bushings 46 and 47. That is, a stiffer bushing material will provide a stiffer steering system whereby more force is required on the side of the chassis to induce a given angle of yaw in the track assembly.

In addition, to further aid turning, as seen in FIG. 11, the tracks and rollers may be shaped with a gentle curved profile 51. This provides a larger effective radius in the centre of the track compared to the peripheral edge so that the track is encouraged to turn when angled with respect to the surface.

Figure 15:
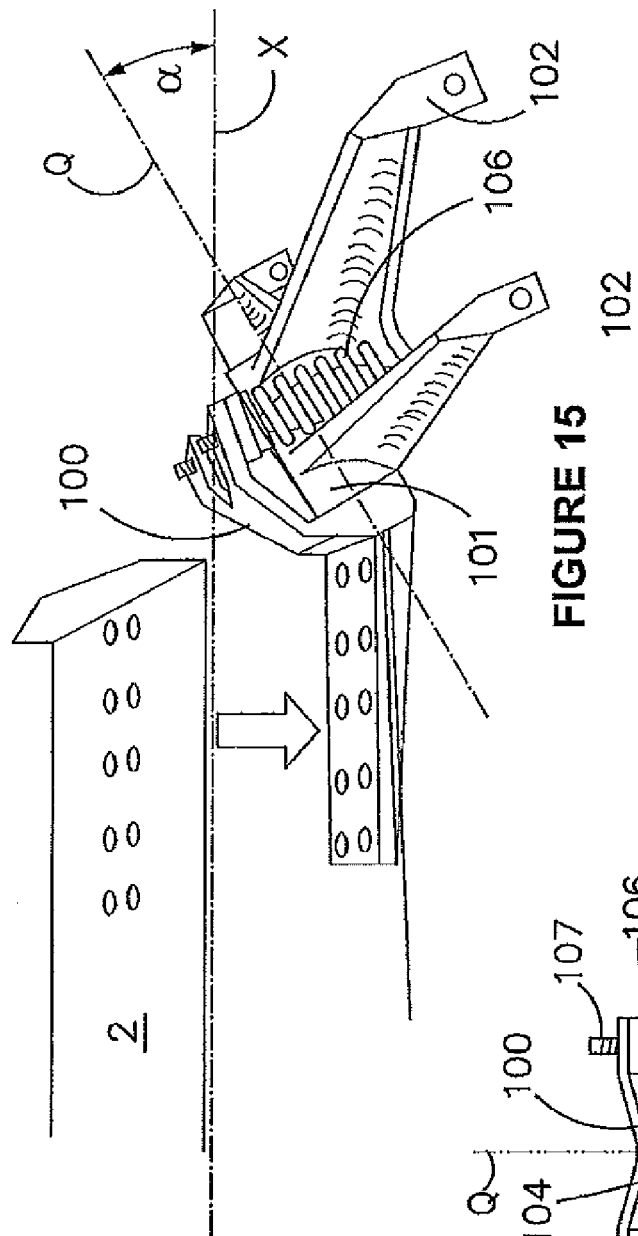
FIG. 15 is a side view of an alternative embodiment of a track assembly, hanger and chassis in accordance with the invention.
Figure 16:
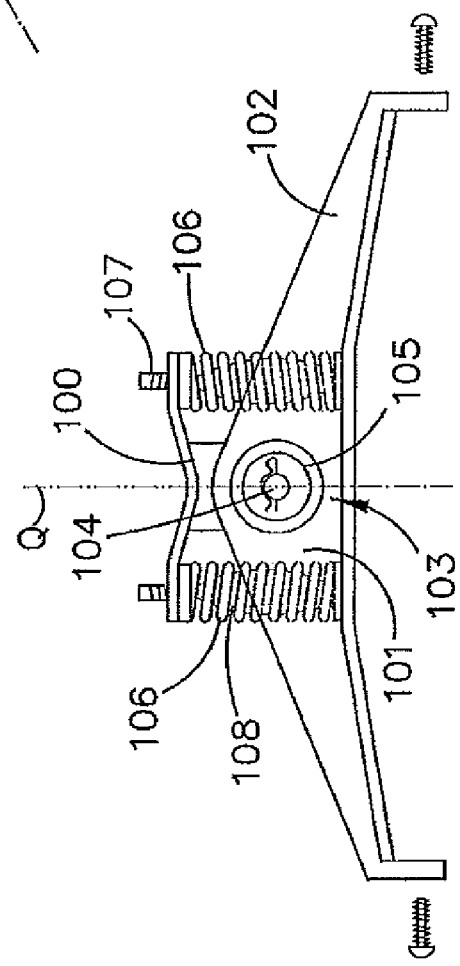
FIG. 16 is an end view of FIG. 15.

An alternative hangar assembly is shown in FIGS. 15 and 16. In this alternative embodiment, the base part is numbered 100 and the yoke part 101. The base is attached to the chassis and the yoke part includes arms 102 for attachment to the track assembly. The yoke and base parts are hingedly attached together to rotate about steering axis Q. However, in this alternative embodiment, the ball and socket pivot arrangement is replaced by a spindle 103 which provides relative rotation between the base and yoke.

As shown in the drawings, the base part 100 includes a stub axle 104, for supporting bearings 105. The bearings may include any combination of bushings, cartridge bearings, cup and cone loose bearings, roller bearings or any other suitable bearings to provide rotational movement between the base and yoke. As with the previous arrangement, the axis of rotation Q is inclined from the horizontal longitudinal axis of the chassis.

To maintain bias towards a central position, at least one resilient member connects the yoke to the base. In this embodiment, two springs 106 are mounted either side of the spindle 103. Each spring is connected to the base 100 at one end and to the yoke 101 at the other end. The stiffness or spring constant of the springs may be selected to alter the stiffness of the steering response in the same manner as the bushings in the ball and socket, bushing arrangement. Spring preload, adjusted by tightening or loosening bolts 107 may also be used to alter the stiffness of the steering response of the vehicle.

In addition, force dampers 108 may be provided to work in conjunction with the springs. In this case they are polyurethane dampers, however, these may be replaced by any other suitable dampers including air, oil or friction dampers.

While not shown in the figures, provision may be provided to adjust the steeling angle α and further alter the steering characteristics of the vehicle.

In addition, the front or rear track assembly may be replaced by a bogie having wheels or a ski.

Another feature of the vehicle is the provision of a suspension system. The suspension system may operate to either suspend each individual roller or the whole track assembly itself. Each system may be applied independently, or they may both be used in conjunction. Both systems can be seen in FIG. 9.

Turning to the track assembly system first, as can be seen in the drawing, the track assembly is connected to the chassis using a parallel linkage 52. The parallel linkage shown is designed to keep a relatively constant angular pitch between the chassis and track assembly. A spring and shock absorber unit 53 are incorporated into the linkage. Alternate linkages such as simple swing arms or struts may be used in place of the parallel linkage.

Alternatively, or additionally, each roller may be individually suspended. FIG. 9 shows one such design for suspending a roller 17. In this case a spring/shock absorber unit 54 is disposed above the roller 17 and actuated telescopically. Alternatively, the roller may be located on a more complex trailing arm linkage or any other form of linkage.

The roller suspension shown also includes a mechanism for automatically maintaining track tension. As can be seen in the drawings, bevel piece 55 mounted on the roller assembly moves upward as the roller is deflected upwards. This bevel activates a pushrod 56 connected to the track tensioner mechanism 28. It will be appreciated that as the roller is deflected upward, some track tension will be lost, to compensate, the end roller is automatically shifted outward to tension the track.

The vehicle shown in the figures is powered by internal combustion engine 5. Drive from the motor is transmitted to the front and rear tracks via a drive train. The engine is centrally mounted to the chassis deck thereby providing a generally even weight distribution between the front and rear track assemblies. In order to dampen vibrations passed to the rider and vehicle, the motor may be mounted by means of shock absorbing bushings or mountings although these are not shown in the drawings.

The motor includes a clutch system 58 to disconnect it from the drive train as required. The clutch is preferably an automatic centrifugal type but may be viscous or electronically controlled. It is also possible that the vehicle is provided with selectable gear ratios. The ratios may be automatic or manually changed by the rider however, it is preferable to have an automatic, variable gear change system to limit required rider inputs and controls.

In addition the vehicle is provided with a braking system. This may be no more than the compression motor braking and/or frictional braking inherent in the drive train. Otherwise, disk, drum or any other type of braking system may be fitted. If the vehicle is electrically powered, an electromagnetic brake system may be considered. The braking system may operate automatically when the motor throttle is shut off.

Figure 2:
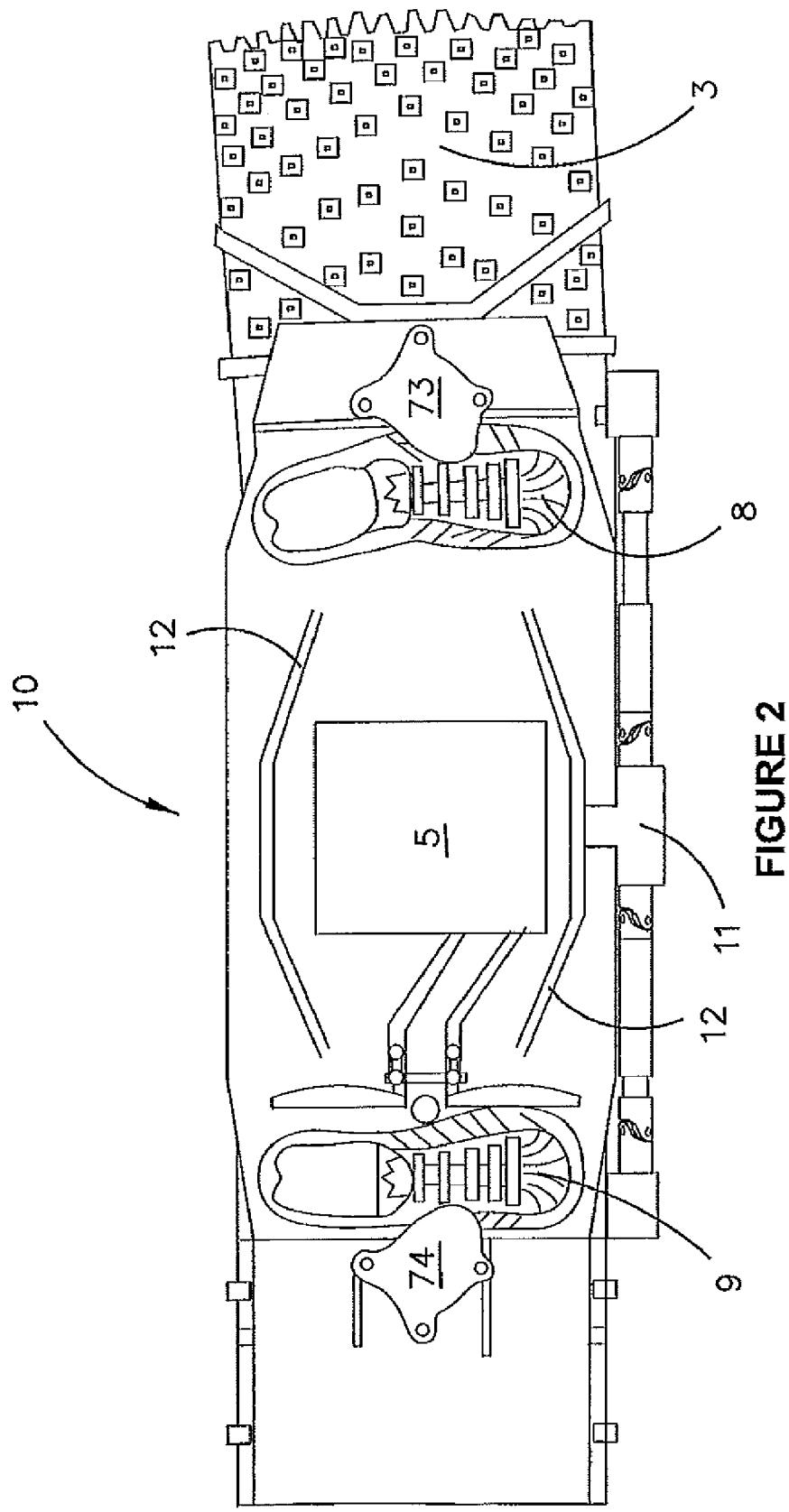
FIG. 2 is a top view of the vehicle shown in FIG. 1.
Figure 14:
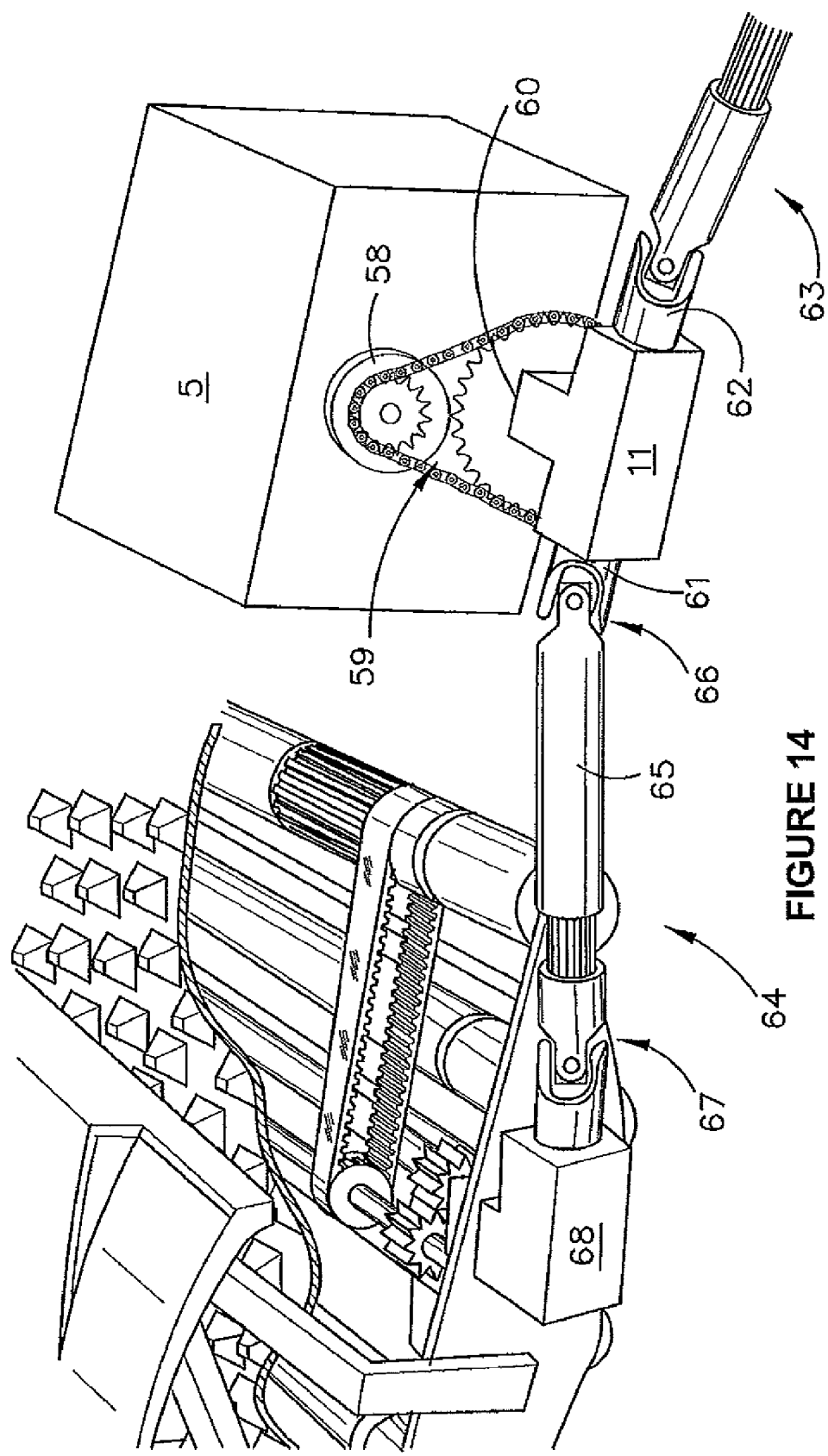
FIG. 14 is a pictorial view displaying the drive train of a vehicle in accordance with the invention.

Referring to FIG. 14 drive from the motor 5 is taken via a reduction gear set 59 to the T-drive gearbox 11. This gearbox 11 can be seen in FIGS. 1 and 2, and includes an input shaft 60 from the reduction gear set which is directly geared to a pair of output shafts 61 and 62, each perpendicular to the input shaft. As such the gearbox is laid out in a "T" formation. In this embodiment, the T-drive gearbox is a simple locked drive gearbox providing an even torque split between the two output shafts. However, other gearbox systems may be used to finely control the torque split front to rear. For instance, a differential or limited slip differential, viscous or electronically controlled torque split gearbox may be used.

Transferring drive to the track assemblies are front and rear drive trains 63 and 64. Each drive train is connected to the T-drive gearbox 11 at one end and the respective track assembly at the other end. Each of drive trains 63 and 64 include a telescopic drive shaft 65 sandwiched between a pair of universal joints 66 and 67. The telescopic shafts include an inner shaft and outer sleeve which are correspondingly ribbed. This allows the drive shaft to lengthen and shorten whilst providing transmission or rotational torque. For illustrative purposes, a schematic of the rear drive train 64 is shown in FIG. 14. The universal joints and telescopic drive shaft allow for variations in displacement and alignment between the motor and the track assemblies. This is critical because as discussed above, it is necessary for the whole track assembly to twist and pivot in relation to the chassis, to effect steering control.

Figure 6:
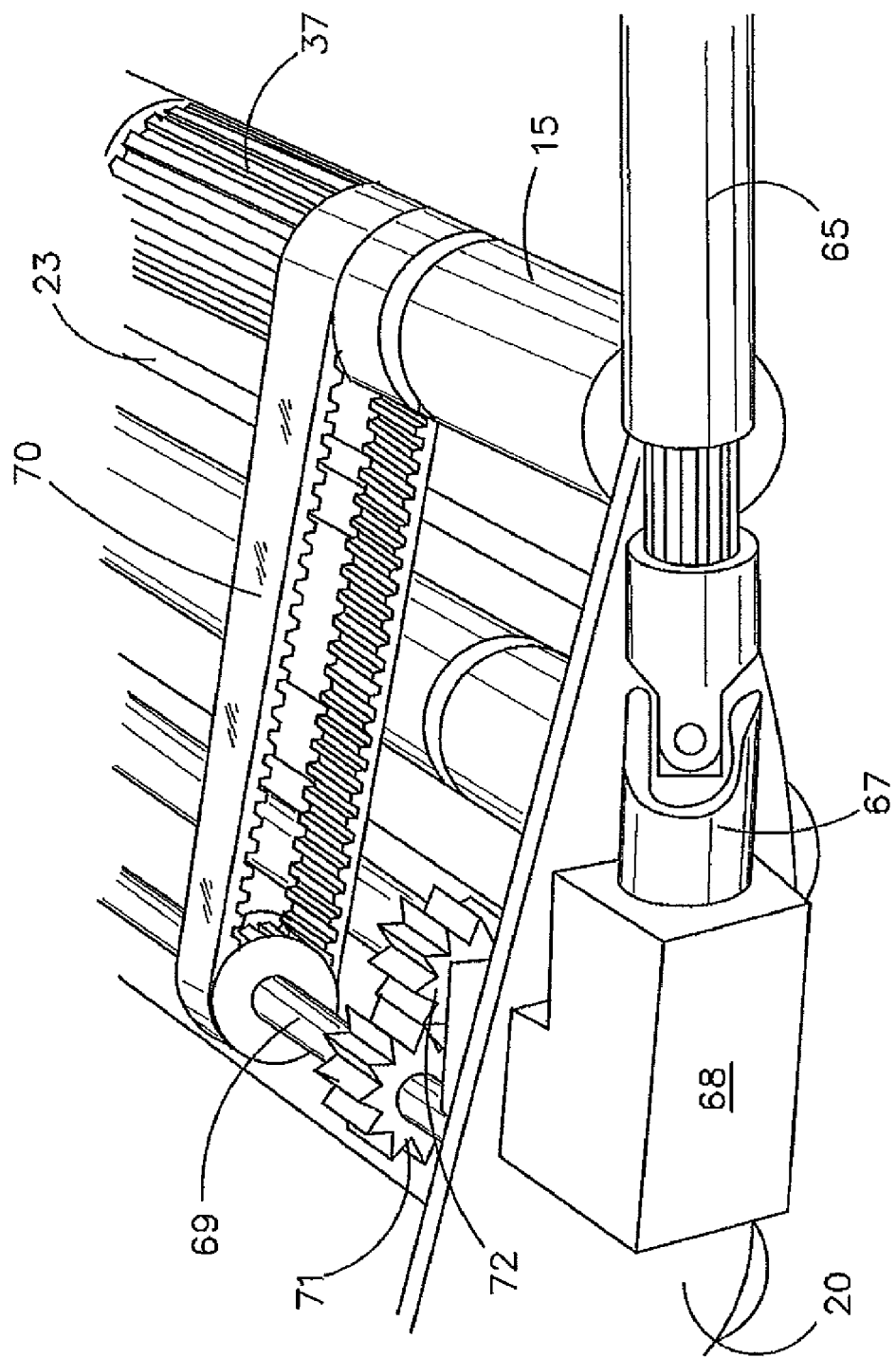
FIG. 6 is a detailed pictorial view of FIG. 5.

Referring again to FIG. 14, L shaped gearbox 68 mounted on the track assembly turns the drive shaft 90°. As seen in FIG. 6, a shaft 69 and belt 70 then take drive to the drive roller 15 which in turn rotates the track. Alternatively, the L-shaped gearbox may connect directly to driven roller 15, eliminating the need for shaft 69 and belt 70. In addition, one of the drive trains may need to be reversed in rotation direction so that the front and rear tracks are rotating in the same direction. This may be accomplished with a pair of gears 71 and 72. Alternatively, the T-drive or L shaped gear boxes may include an integrated gear to reverse drive direction.

Figure 17:
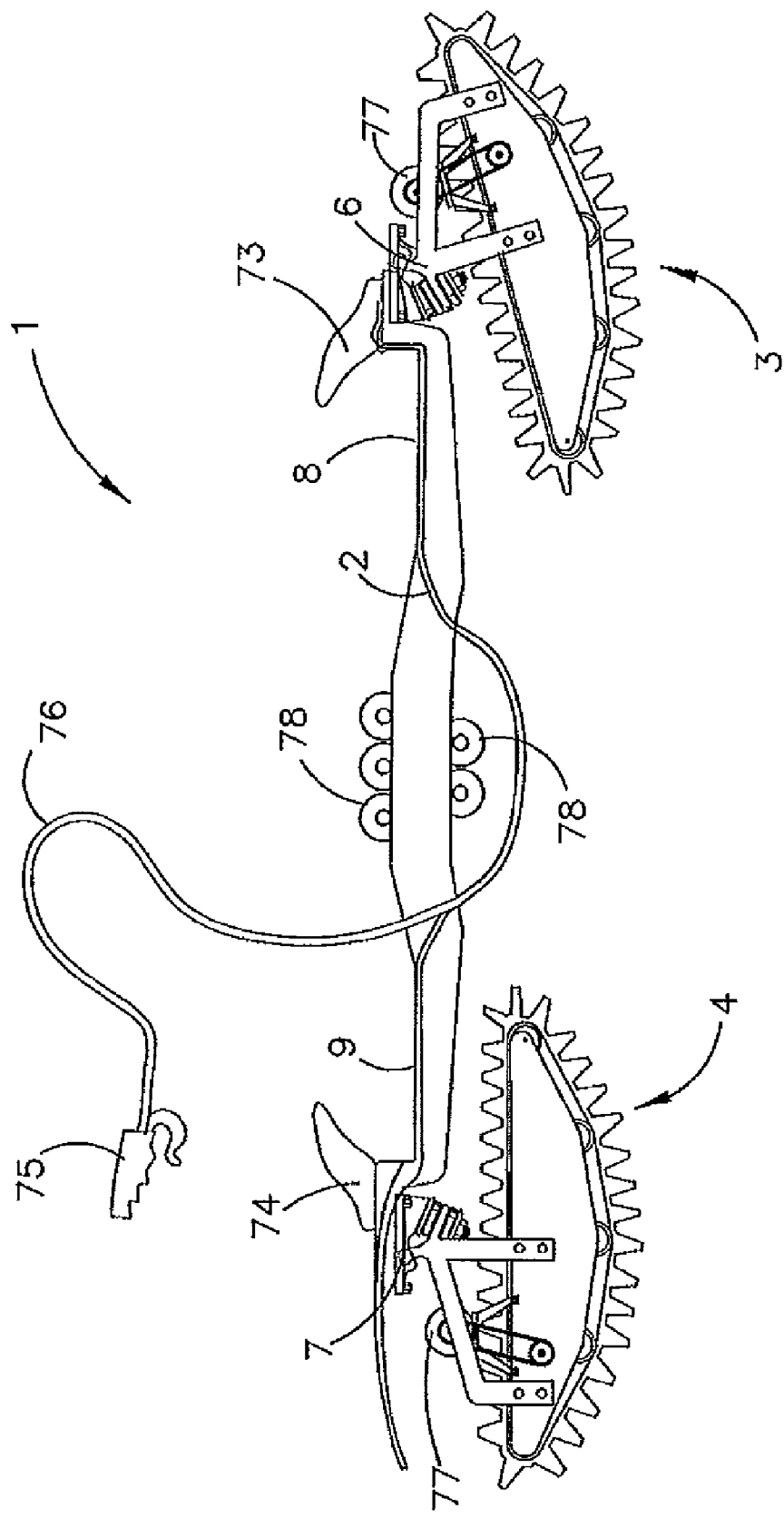
FIG. 17 is a side view of a vehicle in accordance with another embodiment of the invention.
Figure 18A:
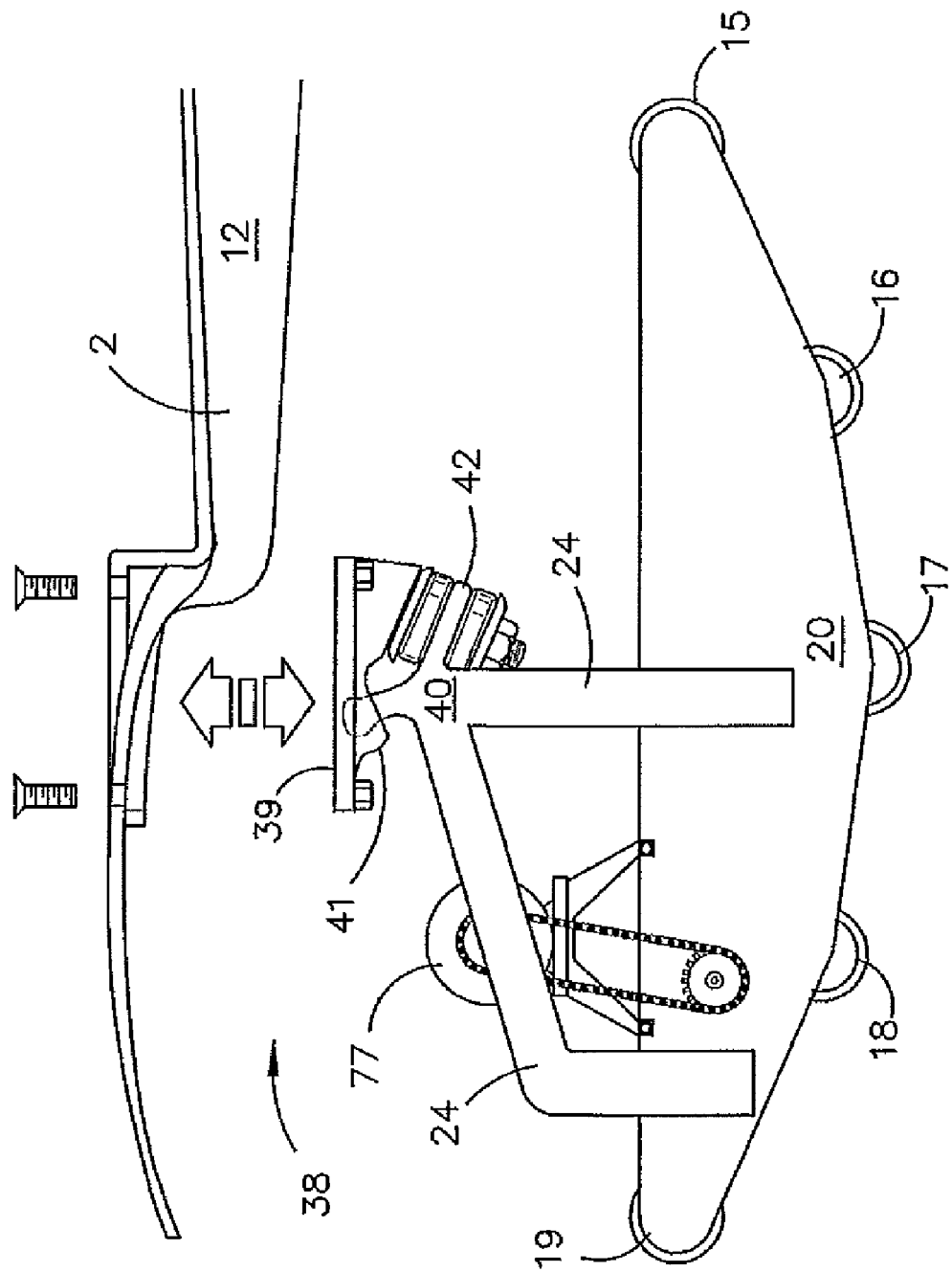
FIG. 18A is a detailed, partially exploded side view of a track assembly, hanger and chassis of the vehicle of FIG. 17.
Figure 18B:
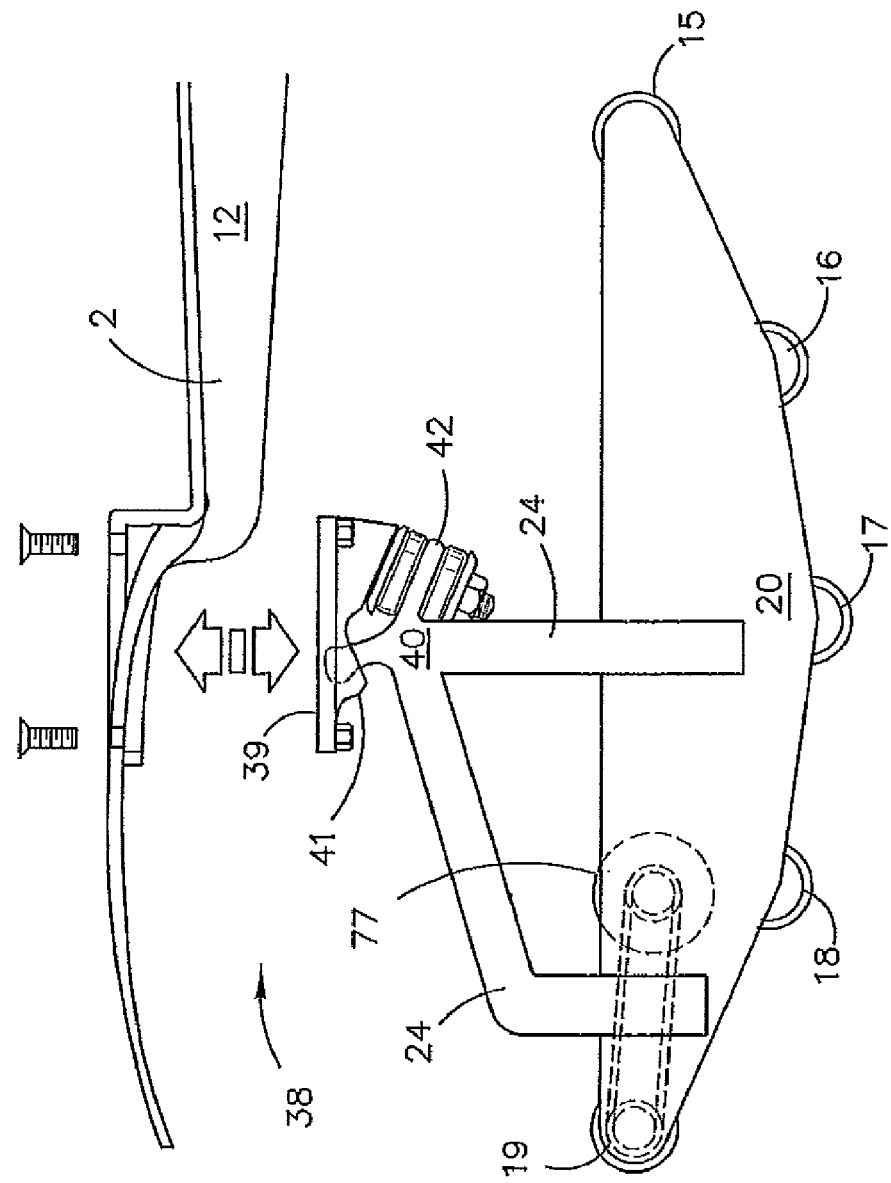
FIG. 18B is a detailed, partially exploded side view of a track assembly, hanger and chassis of a vehicle according to another embodiment of the invention.

In alternative embodiments, the drive train may take up a variety of different incarnations. For instance, the drive train may be replaced with any combination of drive methods including chain, belt, shaft drives, flexible shaft, and even hydraulic or pneumatic drives. The drive train may include one or more differentials or clutches to provide for different track speeds. In addition, the internal combustion engine may be replaced or supplemented by one or more electric motors 77. The electric motors 77 may be centrally mounted to the chassis or mounted in each track assembly, as shown in FIGS. 17 and 18A. Batteries 78 can be distributed on the chassis to modify weight distribution and tune the vehicles handling characteristics. The use of track assembly mounted electric motors has the advantage of greatly reducing the size and complexity of the drive train.

The vehicle is controlled with a combination of throttle/brake usage, foot control and controlled mass distribution. In use, the operator or rider stands astride the vehicle with one foot placed on each of the footpads 8 and 9. The footpads have a rough, grippy surface to provide for increased traction between the riders foot wear and the chassis. In addition, ledges around the footpads and bindings 73 and 74 may be provided to allow the rider to apply force to the chassis as required. For instance, the bindings allow the rider to apply upward force to the vehicle. In this embodiment the bindings are simple shaped formations which overhang the foot pads but in other embodiments the bindings may include purpose made footwear which clip into the foot pad in a similar manner to ski or snowboard bindings. Excessive rotation between the footwear and chassis will result in the rider disengaging from the binding.

A hand control throttle/brake 75 allows the rider to operate the motor speed and braking system to control forward velocity. The hand control device may be connected to the vehicle by a cable 76 or be radio controlled and cordless. In alternative embodiments, the throttle, gear shift and or brake may be operated by foot control.

It will be appreciated that the invention provides a tracked personal transport vehicle. The vehicle's unique tracked drive system allows it to traverse surfaces which may be impassable on similar wheeled vehicles because the tracks provide for a greater surface contact area than a conventional wheel. In all these respects, the invention represents practical and commercially significant improvement over the prior art.

Although the invention has been described with reference to specific examples it will be appreciated by those skilled in the art that the invention may be embodied in many other forms.

The invention claimed is:

1. A motorized board on which a rider stands, comprising;
   a chassis having a longitudinal axis and a rider platform for accommodating the rider standing on the board;
   a front track assembly attached to a front portion of the chassis;
   a rear track assembly attached to a rear portion of the chassis,
   wherein each track assembly includes:
      a plurality of rollers;
      a continuous track looped around the rollers;
      a track assembly mounted electric motor for driving the respective track assembly;
      wherein each track assembly provides a track width defined by respective left and right peripheries of the tracks mounted thereon, wherein each track extends generally continuously across the track width;
      wherein each track has at least one of a generally convex longitudinal profile and a generally convex lateral profile;
      wherein each track assembly includes a sub-chassis connected to the chassis by means of a hanger assembly;
      wherein each electric motor is mounted on the sub-chassis in the respective track assembly outside of the track and adjacent the hanger assembly;
      wherein at least one track assembly is configured to yaw with respect to the longitudinal axis of the chassis in response to the rider adjusting lateral mass distribution on the chassis;
      wherein the rider standing on the board steers the board by adjusting lateral mass distribution on the chassis; and
      wherein mass is distributed toward a direction of an intended turn.

2. The motorized board according to claim 1 wherein the front track assembly is configured to yaw in the same lateral direction as an adjustment in lateral mass distribution on the chassis.

3. The motorized board according to claim 1 wherein the rear track assembly is configured to yaw in the opposite lateral direction as an adjustment in lateral mass distribution on the chassis.

4. The motorized board according to claim 1 wherein each track has the generally convex lateral profile.

5. The motorized board according to claim 1 wherein at least one roller is provided with a convex profile for inducing a convex lateral profile in the track.

6. The motorized board according to claim 1 wherein at least one track assembly includes a sub-chassis connected to the chassis by means of a hanger assembly.

7. The motorized board according to claim 6 wherein the hanger assembly includes a base on the chassis and a yolk connected to the sub-chassis and, wherein the yolk is hingedly connected to the base for rotation about a steering axis elevated from the longitudinal axis of the chassis.

8. The motorized board according to claim 1 wherein at least one roller is a driven roller for driving the track.

9. The motorized board according to claim 8 wherein the motor is connected to the driven roller by means of a drive train disposed between the motor and the driven roller, the drive train further disposed adjacent and crossing one of the respective left and right peripheries of the tracks.

10. The motorized board according to claim 9 wherein the front and rear track assemblies each include at least one driven roller.

11. The motorized board according to claim 9 wherein the drive train includes at least one drive mechanism selected from the group including; chain drive, belt drive, shaft drive, telescopic shaft drive, gear drive, universal drive, flexible shaft drive, hydraulic drive and pneumatic drive.

12. The motorized board according to claim 1 wherein the rider platform includes a deck area having front and rear rider footpads to enable the rider to stand and ride on the board.

13. The motorized board according to claim 1 wherein one of the track assemblies is mounted to the chassis for rotation about a first steering axis elevated from the longitudinal axis of the chassis by a first steering angle.

14. The motorized board according to claim 13 wherein the first steering angle is between 15° and 70°.

15. The motorized board according to claim 14 wherein the first steering angle is between 20° and 55°.

16. The motorized board according to claim 13 wherein the other track assembly is mounted to the chassis for rotation about a second steering axis elevated from the longitudinal axis of the chassis by a second steering axis.

17. The motorized board according to claim 13 further comprising a resilient member for biasing the track assembly toward a central position where the track is generally aligned with the longitudinal axis of the chassis.

18. The motorized board according to claim 1 further comprising a battery mounted on the chassis for powering at least one of the electric motors.

19. The motorized board according to claim 18 further comprising a plurality of batteries mounted on the chassis for powering both of the electric motors.

20. The motorized board according to claim 19 wherein the plurality of batteries are distributed on the chassis to modify weight distribution and to tune the board's handling characteristics.

* * * * *